United States Patent [19]

Arganbright et al.

[11] 3,758,626
[45] Sept. 11, 1973

[54] DIMERIZATION OF OLEFINS WITH SUPPORTED PALLADIUM CATALYSTS

[75] Inventors: Robert P. Arganbright; Edward J. Miklas, both of Houston, Tex.

[73] Assignee: Petro-Tex Chemical Corporation, Houston, Tex.

[22] Filed: July 29, 1970

[21] Appl. No.: 59,370

[52] U.S. Cl......... 260/683.15 R, 252/438, 252/441, 260/683.15 B
[51] Int. Cl............................ C07c 3/12, C07c 3/18
[58] Field of Search .......................... 260/683.15 B; 252/441

[56] References Cited
UNITED STATES PATENTS

| | | | |
|---|---|---|---|
| 2,656,398 | 10/1953 | DeVault.......................... | 260/683.15 |
| 3,354,236 | 11/1967 | Klein.............................. | 260/683.15 |
| 2,825,721 | 3/1958 | Hogan et al. ............... | 260/683.15 X |
| 3,442,964 | 5/1969 | Oldham ...................... | 260/683.15 X |
| 3,379,706 | 4/1968 | Wilke........................... | 260/683.15 X |
| 3,131,223 | 4/1964 | Smidt et al..................... | 252/441 X |
| 3,403,108 | 9/1968 | Leftin et al. .................... | 252/441 X |
| 3,407,223 | 10/1968 | Kominami et al. ............. | 252/441 X |
| 3,013,066 | 12/1961 | Alderson.................... | 260/683.15 X |
| 3,361,840 | 1/1968 | Kohll et al. .................... | 260/683.15 |
| 3,483,269 | 12/1969 | Magoon et al................. | 260/683.15 |
| 3,592,869 | 7/1971 | Cannell.......................... | 260/683.15 |

FOREIGN PATENTS OR APPLICATIONS

711,042   2/1968   Belgium

OTHER PUBLICATIONS

Acres et al., J. Catalysis, Vol. 6, No. 1 (1966) pages 139–141.
Ketley et al., Inorganic Chemistry, Vol. 6, No. 4 (1967) pages 657–663.
Rony, Chemical Engineering Science, Vol. 23 (1968) pages 1021–1034.

*Primary Examiner*—Paul M. Coughlan, Jr.
*Attorney*—G. Baxter Dunaway

[57] ABSTRACT

Palladium salts supported on material such as alumina or silica alumina provide effective catalysts for the dimerization or codimerization of $\alpha$-olefins such as ethylene or propylene in a heterogenous reaction system. The products are easily separated from the catalyst which has a high degree of activity for long periods of time.

16 Claims, No Drawings

DIMERIZATION OF OLEFINS WITH SUPPORTED PALLADIUM CATALYSTS

This invention relates to a novel catalytic process for the preparation of dimers and co-dimers of alpha-olefins. More particularly the process employs particular catalysts of palladium.

It is often desirable to convert lower olefinic compounds to higher olefinic compounds. For example, in the catalytic cracking of petroleum products substantial quantities of ethylene are produced which it is desirable to dimerize to the more valuable butene. Similarly propylene dimers have a wide range of uses. For example, they may be used as fuel or fuel components. They are also useful chemical intermediates. Isoprene can be produced by dimerizing propylene to produce 2-methylpentene-2 which is demethanated.

U. S. Pat. No. 3,013,066 taught that dimers and co-dimers of alpha-olefins could be prepared in an anhydrous reaction medium in the presence of salts of the noble metals of Group VIII of the Periodic Table. This reaction required high pressure, i.e., at least 10 atmospheres and preferably between 50 and 1,500 atmospheres at temperatures of 20° to 275° C.

It is an object of the present invention to provide a heterogenous catalytic process wherein the catalyst is easily removed from the system by virtue of its substantial insolubility therein. Another object of the invention is to provide a process that can be operated under much milder conditions than those described above. Another object is to provide a catalytic process that does not require an inert reaction medium. These and other objects of the invention will become apparent from the description of the invention.

These and other objects are obtained by dimerizing or co-dimerizing $\alpha$-olefins in the presence of particular supported palladium salt catalysts. The catalyst may be prepared by methods known for the preparation of supported catalysts, e.g., by impregnation or co-precipitation techniques. No loss of palladium or palladium salt from the support was noted as a result of the use as described herein.

The palladium salts found useful in the present process are the inorganic acid salts of palladium, in particular those acids which are considered strong acids, i.e., HCl, HBr, HI, $HNO_3$ and $H_2SO_4$. Some particular inorganic acid salts are palladium chloride, palladium bromide, palladium iodide, palladium nitrate, palladium sulfate or mixtures of these salts. Particularly preferred salts are palladium chloride or palladium nitrate.

A wide variety of supports can be used for the palladium salt such as silica, silica-alumina, alumina, aluminum phosphate, zirconia, boria, titania, magnesia, pumice, kieselguhr, firebrick and the like. Particularly preferred are alumina phosphate, silica-alumina and alumina. The supported palladium salt catalyst can be used in a fixed bed or in a movable particulate form, for example, in a slurry or a fluidized bed.

The dimerization or co-dimerization is carried out in either vapor or liquid phase. The pressure can be in the range of 0 to 50 atmospheres or more such as that employed in the prior art. Generally sufficient pressure is employed to maintain the particular state desired, i.e., vapor or liquid phase, although for example more pressure can be employed than is necessary to maintain the liquid phase. Generally the temperature of the reaction will not be too severe and will range from about 0° to 150° C, preferably 25° to 60° C.

In addition to the $\alpha$-olefin reactant the reaction can contain an inert diluent or medium although it is not necessary. In selecting an inert diluent or medium, care should be exercised that the diluent or medium is not also a solvent for the palladium salt. Generally the halogenated solvents, such as chloroform or chlorobenzene and organic nitro compounds such as 2-nitro-propane, dinitrotoluene, nitrocyclohexane and the like would not be suitable. Suitable inert diluents or medium would include the alkyl and aromatic hydrocarbons such as butane, hexane, octane, benzene, toluene, xylene and the like.

The reaction can be conducted as a batch operation or in a continuous manner. The fluid reactants can be conducted through the reaction chamber at a wide range of flow rates. The optimum flow rate will depend on such variables as the temperature of the reaction, pressure, particle size and the like. Generally the flow rates will be within the range of about 10 to 120 volumes of olefin to be reacted per volume of reaction zone containing catalyst per hour (referred to as GHSV).

The amount of palladium salt on the support is relatively small. Any ratios or reference herein refers to the surface of the catalyst in contact with the fluid phase during the dimerization or codimerization. Generally, there will be about 2 to 5 wt. percent palladium salt on the support.

Preferred $\alpha$-olefins contemplated in the present invention contain two to nine carbon atoms. Some suitable mono-olefins are ethylene, propylene, butylene, hexene and nonene. The chains may be straight or branched. A preferred group of mono-$\alpha$-olefins is ethylene, propylene, butene or mixtures thereof.

EXAMPLE 1

A solution of palladium chloride was prepared by dissolving 4 grams of $PdCl_2$ in 60 ml of 3 M HCl solution. Twenty ml of this solution was added to 50 ml of a silica-alumina support (87.3 percent silica, 12.4 percent alumina, surface area 425–450 $m^2/g$ designated Houdry S-90) placing about 3.17 weight percent $PdCl_2$ on the support. The catalyst was dried at 200° C. under vacuum.

EXAMPLE 2

The catalyst pellets prepared in Example 1 were placed in a 1-inch diameter 13" tubular reactor and ethylene was fed at 20 ml/minute at 25° C. and 1 atmosphere of pressure. After 1 hour, analysis of the effluent showed 39 wt. percent n-butene-2, 59.4 wt. percent ethylene and a trace of n-butene-1. After 60 hours on stream the effluent was 43 wt. percent n-butene-2 and 57 wt. percent ethylene. The temperature was raised to 50° C. and after 1/2 hour the system stabilized at 45 wt. percent n-butene-2 and 55 wt. percent ethylene.

EXAMPLE 3

The catalyst and reactor of Example 2 were employed. The feed was propylene at 30 ml/minute and ethylene at 10 ml/minute at 60° C. at 1 atmosphere. The effluent contained about 12.6 wt. percent n-butene-2, 1.4 wt. percent n-butene-1, 1.5 wt. percent n-pentene-1, 13.5 wt. percent n-pentene-2, 0.8 wt. percent of 2-methyl butene-2 and 4 wt. percent of higher boiling material.

EXAMPLE 4

In a manner similar to Example 1, 2.6 g. of $PdCl_2$ was deposited on 100 ml. of alumina (Alcoa H-151 previously treated with a 5 percent aqueous HF solution and dried). After drying at 200° C. under vacuum, this catalyst was placed in a tubular glass reactor, cooled to 25° C. and ethylene was fed at 20 ml/min. After 16 hours on stream, the effluent analyzed as 97.5 percent ethylene and 2.5 percent butene of which 15 percent was butene-1 and 85 percent butene-2. On increasing the reactor temperature to 50° C., the effluent after 1 hour analyzed as 6.0 percent butene and 94 percent ethylene.

Changing the feed to 20 ml/min. propylene and 10 ml/min. ethylene over this catalyst at 50° C. produces an effluent analyzed as 84.3 percent ethylene and propylene, 14.6 percent butene and 1.1 percent n-pentene-2.

EXAMPLE 5

50 ml. of Alcoa H-151 alumina was treated with excess phosphoric acid and then was dried under vacuum at 200° C. The alumina was treated further after drying, with sufficient $PdCl_2$ in 3M HCl solution to give about 2.7 percent $PdCl_2$ by wt. on the support. The catalyst was dried again at 200° C. under vacuum and was placed in a tubular reactor. A mixture of ethylene and propylene at 5 ml/min. each gave an effluent containing 6.3 percent butene and 6.0 percent n-pentene-2 and unreacted feed.

This catalyst lost activity at higher temperatures up to 150° C. The catalyst could be regenerated to its original activity by treatment with HCl and air at 200° C. (flow rates 20 ml/min. HCl and 40 ml/min. air) for 1 hour. After purging with nitrogen the catalyst was cooled to 65° C. where a feed of propylene (50 ml/min.) and ethylene (10 ml/min.) gave an effluent of 10 percent pentenes, 7 percent butenes and unreacted feed.

EXAMPLE 6

2 ml. of aluminum phosphate (Girdler T-1067) was treated with excess 10 percent palladium nitrate solution, filtered and dried under vacuum at 50° C. This catalyst was placed in a 50 ml. Erlenmeyer flask stoppered with a rubber septum. The flask was purged and pressured to 5 psig with ethylene. Some immediate dimerization to butene was noted. On standing for about 64 hours at room temperature, approximately 25° C., all of the ethylene had dimerized to 80 percent trans-butene-2, 15 percent cis-butene-2 and 5 percent butene-1.

EXAMPLE 7-10

In a manner similar to Example 1, 3.6 g. of $PdCl_2$ was deposited on an aluminum phosphate (Girdler T-1067) surface area of 47 $m^2/g$ and 3.82 $PdCl_2$ deposited on alumina (Alcoa H-151-previously treated with 10 percent $H_3PO_4$ and dried at 400° C. - containing by typical analysis 85 wt. % $Al_2O_3$, 6.3 wt. % $SiO_2$, 2.0 wt. % $Na_2O$ and 0.15 $Fe_2O_3$-surface area 350 $m^2/g$).

In examples 7-9, 50 cc of the $PdCl_2$-aluminum phosphate catalyst was charged to a tubular reactor. In Example 10, 50 cc of the $PdCl_2$-alumina was charged to the reactor. The conditions and olefin feeds are shown in the Table. Yields were comparable to those of previous examples.

The corrosion problems encountered in conventional liquid phase homogenous palladium salt reactions such as those of U.S. Pat. No. 3,013,066 are avoided in the present heterogenous process since the palladium salts do not come in contact with the reactor. This advantage allows the use of less expensive materials of construction for reactors, separation and recovery equipment and the like. Additionally, the likelihood of the loss of the expensive palladium salts is substantially eliminated or reduced.

TABLE
Fixed Bed-50cc Catalyst Charge

| Example | Support Composition | Surface area ($m_2/g$) | Coating g/50 cc Support | Temp °C | Feed | Products |
|---|---|---|---|---|---|---|
| 7 | Aluminum Phosphate | 47 | 3.6g $PdCl_2$ | 125 | Ethylene | cis-and trans-butenes, and butene-1 |
| 8 | Aluminum Phosphate | 47 | 3.6g $PdCl_2$ | 125 | Propylene | 2,3-dimethybutene-2, n-hexene-3 and 2-methylpentane-2 |
| 9 | Aluminum Phosphate | 47 | 3.6g $PdCl_2$ | 125 | Ethylene Propylene | n-pentene-2, n-pentene-1, 2-methyl butene-2 and traces of 2-methyl butene-1 and isopropyl chloride. |
| 10 | Alumina [1] | 350 | 3.8g $PdCl_2$ | 125 | Ethylene | Butylenes |

[1] Treated with 10 wt. % $H_3PO_4$ and dried at 400° C prior to impregnation.

The invention claimed is:

1. A process for preparing dimers and co-dimers of α-monoolefins consisting essentially of contacting an α-monoolefin reactant selected from ethylene, propylene or mixtures of ethylene and propylene in the presence of a catalytic amount of a material consisting of an inorganic acid salt of palladium on a support which is aluminum phosphate, silica-alumina or alumina at a temperature of between 0° and 150° C. and at a pressure of between 0 and 50 atmospheres.

2. The process according to claim 1 wherein the inorganic acid salt of palladium is selected from the group consisting of palladium chloride, palladium bromide, palladium iodide, palladium nitrate, palladium sulfate and mixtures thereof.

3. The process according to claim 2 wherein the inorganic acid salt of palladium is palladium chloride or palladium nitrate.

4. The process according to claim 1 wherein the temperature is between 25° and 60° C.

5. The process according to claim 1 wherein said α-monoolefins are in the gaseous phase.

6. The process according to claim 5 wherein the inorganic acid salt of palladium is palladium chloride.

7. The process according to claim 6 wherein the support is silica-alumina and the α-monoolefin comprises ethylene.

8. The process according to claim 7 wherein the α-monoolefin comprises ethylene and propylene.

9. The process according to claim 6 wherein the support is alumina and the α-monoolefin comprises ethylene.

10. The process according to claim 1 wherein the inorganic acid salt of palladium is palladium nitrate.

11. The process according to claim 6 wherein the support is aluminum phosphate and the α-monoolefin comprises ethylene.

12. The process according to claim 1 wherein the support is aluminum phosphate and the α-monoolefin is propylene.

13. The process according to claim 1 wherein an inert diluent is present with the α-monoolefin reactant.

14. The process according to claim 1 wherein said α-monoolefin is ethylene.

15. The process according to claim 1 wherein said α-monoolefin is propylene.

16. The process according to claim 1 wherein said α-monoolefin is a mixture of ethylene and propylene.

* * * * *